April 21, 1964 H. J. BERNARD ETAL 3,129,957
TRAILER HITCH LOAD DISTRIBUTING MEANS
Filed Nov. 23, 1962 2 Sheets-Sheet 1
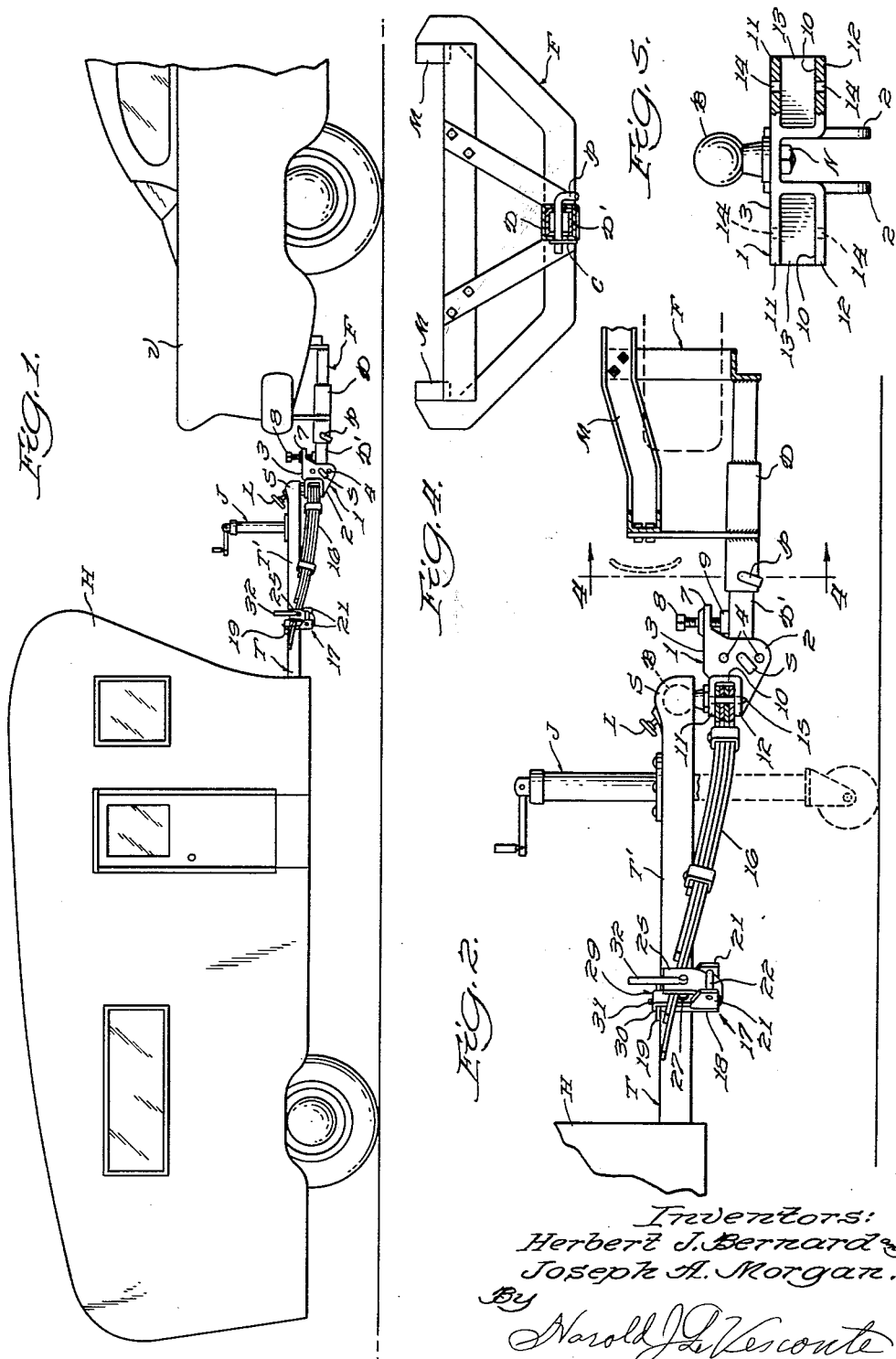
Inventors:
Herbert J. Bernard and
Joseph A. Morgan.
By Harold J. L. Vescoute
Atty.

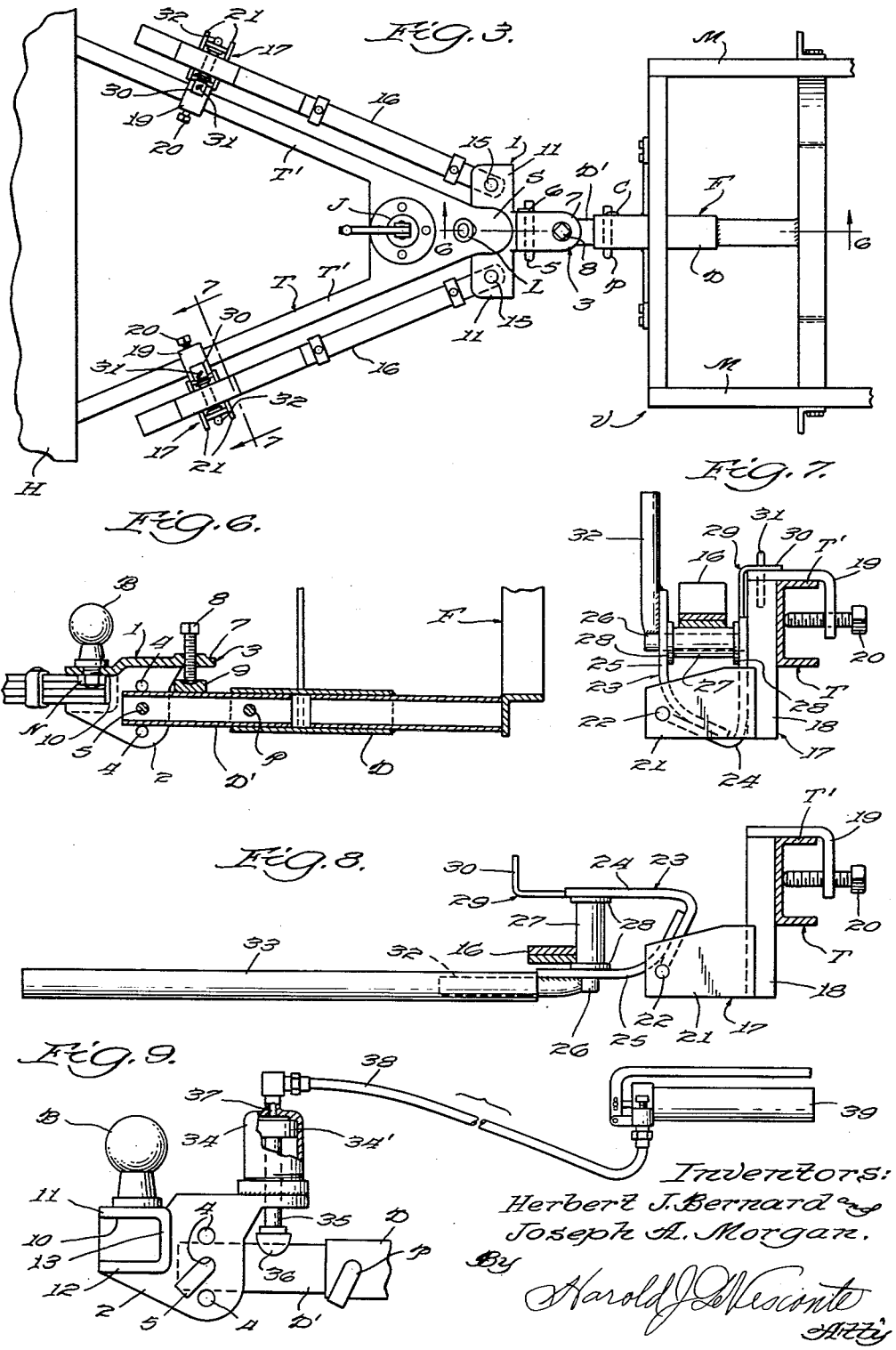

3,129,957
Patented Apr. 21, 1964

3,129,957
TRAILER HITCH LOAD DISTRIBUTING MEANS
Herbert J. Bernard, 11851 Stagg St., and Joseph A. Morgan, 12021 Stagg St., both of North Hollywood, Calif.
Filed Nov. 23, 1962, Ser. No. 239,758
8 Claims. (Cl. 280—406)

This invention relates to devices for coupling a house trailer or similar vehicle to an automotive vehicle for towing it, and more particularly to devices of the above character having improved variable means for regulating the proportion of the weight of the trailer to be imposed on the front and back wheels of the towing vehicle.

The principal object of the invention is to provide an improved trailer hitch preloading means characterized by means for significantly varying the proportional weight of the trailer to be imposed on the front and rear portions of the spring system of the towing vehicle.

Another object of the invention is to provide a device of the above character in which the adjusting means comprises a screw threaded element.

A further object of the invention is to provide a trailer hitch of the above character employing fluid pressure means for effecting said adjustment.

Still another object of the invention is to provide a device in which the foregoing objectives are achieved in practice, which is simple in design and economical to manufacture, is readily applied to existing trailer hitch devices, and which is effective for its intended purpose.

With the foregoing objects in view, together with such additional objects and advantages as may subsequently appear, the invention resides in the parts, and in the construction, combination, and arrangement of parts described, by way of example, in the following specification of certain presently preferred embodiments of the invention, reference being had to the accompanying drawings which form a part of said specification and in which drawings:

FIG. 1 is a side elevational view of a trailer coupled to the rear end of a towing vehicle by a trailer hitch including one embodiment of the present invention, FIG. 2 is an enlarged side elevational view of the device or embodiment shown in FIG. 1, FIG. 3 is a top plan view of the device shown on the same scale as FIG. 2, FIG. 4 is a transverse sectional view of the drawbar means of a towing vehicle, the section being taken on the line 4—4 of FIG. 2, FIG. 5 is a further enlarged rear elevational view of the head element of the first embodiment of the invention which is attached to the drawbar means of the towing vehicle, FIG. 6 is a fragmentary longitudinal sectional view taken on the line 6—6 of FIG. 3, FIG. 7 is an enlarged scale, transverse sectional view taken on the line 7—7 of FIG. 3 and showing one of the spring end supporting saddle means in spring supporting position, FIG. 8 is a view similar to FIG. 7 but showing the spring supporting saddle in position for loading or unloading the end of a spring supported thereby, and FIG. 9 is a fragmentary side elevational view, of a second embodiment of the invention comprising a spring supporting head element tiltably mounted on the towing vehicle drawbar and adapted to be adjusted by hydraulic pressure means.

Referring to the drawings, FIG. 1 shows a house trailer H having the apex of the V-shaped tongue structure T thereof coupled to the rear end of a towing vehicle V; said vehicle having a drawbar supporting framework F bolted or otherwise attached to the side frame members M, M of the vehicle and said frame work including a rectangular, horizontal sleeve D open at the rear end thereof in which a drawbar element D' is slidably received and is removably secured therein by a crosspin P locked by any suitable means such as a cotter pin C. The foregoing structure forms a suitable drawbar means for detachably connecting a trailer to a towing vehicle, it being understood that the exact construction varies to suit individual vehicle frame construction so long as a centrally disposed drawbar projects rearwardly from the vehicle to carry a ball headed connector B which is received in a mating socket S fixed to the trailer tongue structure T, said socket being provided with a suitably releasable latch member L to lock the ball B therein.

Next referring to FIGS. 1 through 8, in the first embodiment of the present invention, the ball B instead of being mounted directly on the drawbar D' is mounted on a head member 1 having spaced parallel walls 2, 2 depending from a top platform surface 3 on the rear edge of which and rearwardly of the end of the drawbar D', the ball B is secured by a nut N. The walls 2, 2 straddle the sides of the drawbar D' and are provided with pairs of axially aligned horizontal holes 4 disposed in spaced vertical relationship. A clevis pin 5 extending through a selected pair of said holes and through a complementary hole in the rear end of the drawbar affords means by which the head member 1 may be detachably mounted on the rear end of the drawbar D' at a selected vertical relation thereto and with capacity to rock about the axis of the clevis pin 5. A cotter pin 6 serves to hold the clevics pin 5 in place. The platform portion 3 of the head member 1 includes a forwardly extending bracket portion 7 disposed in spaced relation above the drawbar D' and carries a setscrew 8 engaging a socket in a block 9 seated on the top surface of the drawbar. Adjustment of the setscrew 8 will cause rocking of the head 1 about the pivot afforded by the clevis pin 5 in the one of the pairs of holes in which it happens to be located. When the clevis pin 5 is located in the uppermost pair of the holes 4, the block 9 is dispensed with and when located in the lowermost pair of said holes, either a longer setscrew or a thicker block 9 can be provided as may be preferred.

The head member 1 includes a pair of spring end receiving sockets 10, 10 disposed below the platform 3 and outwardly of the sidewalls 2, 2; said sockets being defined by the under faces of the top walls 11, 11 formed by lateral extensions of the platform 3, parallel bottom walls 12, 12 below said top walls 11, 11, the outer faces of the walls 2, 2, and the front walls 13, 13; said sockets being generally rectangular in configuration and being open at the outer side and the rear side only. The top and bottom walls of each of the sockets 10, 10 are provided with aligned holes 14, 14 for reception of a removable pin 15 by which the multiple leaf ends of each of a pair of cantilever, multiple leaf springs 16, 16 is secured in one each of said sockets with capacity for movement about the axes of the pins 15, 15.

From their attachment to the head 1 by the pins 15, 15 the spring assemblies extend generally parallel to the respective sides of the trailer tongue structure T and adjacent to the said rear ends thereof are mounted in saddle assemblies 17, 17 carried by the side members T', T' of the trailer tongue structure T. Since these saddle assemblies are identical, a description of one will serve for both. Each saddle assembly comprises a body portion 18 which extends downwardly along the outer face of the trailer tongue side member and is provided with a bracket member 19 extending across the top of the trailer tongue side member and thence downwardly on the inner face thereof, the distal end of said bracket member having a threaded bore receiving a setscrew 20 engaging the inner face of the trailer tongue side member and effective thereby to clamp the body portion 18 against the outer side face of the trailer tongue side member.

At its lower end, the body portion 18 of the saddle assembly is provided with laterally outwardly extending, parallel arms 21, 21 in the outer ends of which a pivot pin 22 is journaled. The pivot pin 22 is connected to the closed end of and supports a yoke 23 and the inner and outer arms 24 and 25 of said yoke support a spindle 26 which is disposed transversely to the length of the associated one of the leaf spring assemblies 16. A spring end supporting roller 27 is freely rotatable on said spindle; said roller having spring retaining flanges 28, 28 at each end thereof. The yoke may be swung about the axis of the pin 22 between a spring supporting position (FIG. 7) and a spring mounting and removing position (FIG. 8). When in the spring supporting position, the yoke arm 24 is flat against the outer face of the body portion 18 and the roller 27 is horizontal and in supporting engagement with the under face of the thinner end of the associated spring assembly 16; it being noted that the position of the pin 22 is outwardly of the spring, wherefore, the bias exerted by the spring 16 will tend always to hold the yoke in that position. However, for safety, the yoke arm 24 is provided with a keeper member 29 having a distal end 30 which overlies the top surface of the bracket member 19 and a removable dowel pin 31 extending through the keeper and seated in a bore in the top face of the bracket 19 prevents unintentional dislodgment of the yoke from its spring supporting position. Preferably, the outer arm 25 of the yoke is provided with a handle portion 32 adapted to be engaged by suitable extension 33 such as a length of pipe for swinging the yoke into and out of its position of use.

In the absence of compensating means of some character, the weight of a trailer forwardly of the wheels thereof is greater than can be properly accommodated by the rear springs of the towing vehicle, so much so that it actually causes a decrease in the weight applied to the front wheels with resultant possibility of loss of steering control particularly in crosswind and turning situations. In the present invention by screwing down on the screw 8 with resultant counterclockwise rocking of the head 1 about the clevis pin 5 and consequent bowing of the spring assemblies 16, 16, the reactive force is that of the drawbar trying to be rocked in a clockwise direction about the clevis pin 5 as viewed in FIGS. 1 and 2 with resultant decreasing of the combined load of the rear end of the towing vehicle and of the trailer on the rear springs of the vehicle and a corresponding increase of the load on the front springs of the vehicle, the proper point of the applied tension by the device being determined by the distance of the drawbar above the ground which should be about that of the normal height of the vehicle rear end assuming a normal uniform load therein. In applying the coupling means to connect a trailer with a towing vehicle, the head 1 is first mounted on the drawbar and the trailer tongue is connected to the ball of the head member 1. By use of the usual trailer tongue jack J, this connection can be readily effected. The spring assemblies are then connected to the head with the distal ends of the spring assemblies extending out somewhat laterally therefrom and they are then brought into contact with the saddle assemblies which are in the open position as shown in FIG. 8 and the saddle assemblies are then brought to their closed or spring supporting position and secured. Thereafter the tension is applied to the device either by the screw 8 or the hydraulic cylinder, depending upon the type of adjusting means employed. When the towing vehicle is to be disconnected from the trailer, the trailer tongue jack is extended, the tension is relieved from the spring assemblies, the saddles are swung to their unlocked position, the spring assemblies are removed from the head and the trailer tongue is detached from the ball on the head.

Attention is directed to the rollers 27, 27 which support the rear ends of the leaf spring assemblies. As the connected vehicles assume different angular relation to each other, as in going around curves, the distances between the pins 15, 15 and the rollers 27, 27 at the opposite sides of the trailer tongue increase at one side and decrease at the other. The rollers 27, 27 serve to permit this compensatory action with a minimum of frictional opposition. Also the pins 15, 15 permit the spring assemblies to pivot thereon incident to such turning action.

Referring finally to FIG. 9, an alternative form of preloading means for the invention is shown. In this embodiment, the adjusting screw 8 is replaced by a hydraulic cylinder 34 fixed to the platform surface 3 as by welding or other suitable means; said cylinder being provided with a piston 34' attached to a downwardly extending piston rod 35. The distal end of the piston rod engages a saddle 36 on the drawbar D'. The cylinder 33 at the side of the piston remote from the piston rod is provided with a port 37 connected by a flexible conduit 38 with a manually operable combined hydraulic pump and fluid reservoir 39 of a type which is readily available on the market; said conduit preferably having sufficient length to enable the pump to be carried either in the towing vehicle or in the trailer without disconnection. In general, the operation of the device is like that of the first described embodiment of the invention, the only difference being that the bias to the spring assemblies 16, 16 by rocking the head 1 is derived from the application of hydraulic pressure within the cylinder 33 causing downward movement of the piston and piston rod against the drawbar and with the same result with respect to the distribution of the load on the towing vehicle spring suspension system as in the first embodiment of the invention.

While in the foregoing specification, there have been shown certain presently preferred embodiments of the invention, such disclosure has been by way of example and it is not to be inferred therefrom that the invention is limited to the specific embodiments thus disclosed. Accordingly, it will be understood that the invention includes as well all such changes and modifications in the parts and in the construction, combination and arrangement of parts as shall come within the purview of the appended claims.

We claim:

1. The combination with a trailer hitch of the type comprising a ball component carried by a drawbar extending rearwardly from the towing vehicle and detachably engaging complementary socket means carried by a trailer tongue of means for distributing the load imposed by the trailer on the towing vehicle frame; said load distributing means comprising a head element mounted on the towing vehicle drawbar for pivotal movement about a horizontal axis extending transversely of the drawbar and carrying the ball component of the trailer hitch, a pair of leaf spring elements disposed one each at each side of the ball and each having one end thereof attached to said head element in fixed vertical relation to said ball, said leaf spring elements thence extending rearwardly along the respective sides of the trailer tongue, a pair of spring supporting means carried by opposite sides of the trailer tongue rearwardly of the ball engaging socket thereof and supporting the other ends of said leaf spring elements, and means for rocking said head element about the said horizontal axis to a desired extent in a direction operative to cause said leaf spring elements to impose a downward bias on said spring end supporting means of sufficient magnitude to cause the reaction to said bias to transfer a significant proportion of the downward load of the trailer on the hitch and the rear end of the towing vehicle frame to the forward end of that frame and the front wheels of the towing vehicle through the spring system of the towing vehicle.

2. A trailer hitch load distributing means as claimed in claim 1 in which said leaf spring elements are detachably connected to said head element.

3. A trailer hitch load distributing means as claimed in claim 1 in which each of said spring element supporting means carried by the trailer tongue includes a freely rotatable roller engaging the under surface of the spring element end effective to permit relative longitudinal movement therebetween incident to turning movements of the trailer and towing vehicle.

4. A trailer hitch load distributing means as claimed in claim 1 in which said leaf spring element supporting means includes a relatively movable member operable to engage and retain the said other end of a spring leaf element to be supported thereon or to disengage said other end of such spring element.

5. A trailer hitch load distributing means as claimed in claim 1 in which separate means for attaching each of said leaf spring elements is provided, in which each of said separate means to said head element permits movement of the end of the spring element attached thereby about a vertical axis, and in which the said vertical axes of said attaching means are disposed at opposite sides of said head member.

6. A trailer hitch load distributing means as claimed in claim 1 in which said head element is provided with means affording selectively mounting of said head element on the towing vehicle drawbar at an optionally selected one of a plurality of vertical elevations.

7. A trailer hitch load distributing means as claimed in claim 1 in which the means for rocking said head element on the drawbar comprises screw threaded, manually operable means interposed between said head element and the drawbar on which said head element is mounted.

8. A trailer hitch load distributing means as claimed in claim 1 in which the means for rocking said head element on the drawbar comprises a hydraulic cylinder and piston means.

References Cited in the file of this patent
UNITED STATES PATENTS

| | | |
|---|---|---|
| 2,643,891 | Mosley | June 30, 1953 |
| 2,727,755 | Hume | Dec. 20, 1955 |
| 2,772,098 | Seeley | Nov. 27, 1956 |
| 2,863,673 | Lisota | Dec. 9, 1958 |
| 2,898,124 | Bernard et al. | Aug. 4, 1959 |